Patented May 20, 1941

2,242,456

UNITED STATES PATENT OFFICE 2,242,456

POLYAZODYESTUFFS

Detlef Delfs and Eberhard Stein, Leverkusen-I. G.-Werk, Germany, assignors to General Aniline & Film Corporation, a corporation of Delaware No Drawing. Application March 7, 1939, Serial No. 260,341. In Germany March 11, 1938

15 Claims. (Cl. 260—166)

The present invention relates to new polyazodyestuffs and to a process of preparing the same, more particularly it relates to polyazodyestuffs of the following general formula:

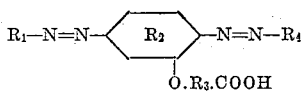

In this formula $R_1$—N=N— stands for the radical of any diazo compound, —O.$R_3$COOH stands for the radical of a hydroxy-carboxylic acid, the hydroxy group of which stands in α- or β-position to the COOH-group, $R_4$ stands for the radical of a coupling component bearing a hydroxy group in a position adjacent to the —N=N— bridge, $R_2$ may be further substituted and at least one of the radicals $R_1$ and $R_4$ is substituted by an arylazo radical.

The new dyestuffs are obtained by coupling the diazo compounds of amino-azodyestuffs of the general formula:

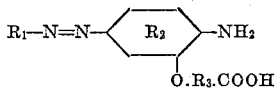

in which $R_1$, $R_2$ and —O.$R_3$.COOH mean the same as above, with a coupling component, coupling in a position adjacent to a hydroxy group, and selecting the components in such a way that the final dyestuffs contain at least three azo groups.

The new dyestuffs possess good affinity to the vegetable fiber and the dyeings obtained therewith are distinguished by the property of being improved in their fastness to washing and light when aftertreated with metal salts, especially with copper salts.

The following examples illustrate the invention without, however, limiting it thereto, the parts being by weight.

Example 1

A hydrochloric diazo solution corresponding to 6.9 parts of sodium nitrite is prepared of the aminoazodyestuff which is obtained by coudiazotized 2-aminonaphthalene-4.8-disulfonic acid with m-toluidine, subsequently diazotizing and coupling with 4-methyl-2-aminophenoxy-acetic acid. To this solution there is added at 5° C. with stirring the solution of 37.8 parts of the dyestuff, which is obtained by an acid coupling of diazotized aminotriazole-carboxylic acid with 2-amino-5-hydroxynaphthalene-7-sulfonic acid, and 85 parts of anhydrous sodium carbonate in 1400 parts of water, keeping the mixture sodium carbonate alkaline during the coupling. When the coupling is complete the dyestuff is salted out. It corresponds in the free state to the following formula:

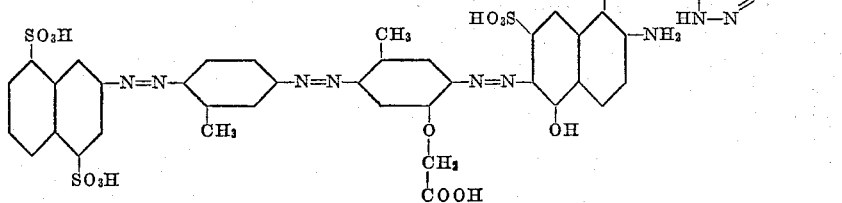

and dyes cotton blue-grey shades; the dyeing aftertreated with copper salts is grey.

Example 2

A suspension of the diazo compound corresponding to 6.9 parts of sodium nitrite is prepared of the dyestuff which is obtained by coupling diazotized 2-aminonaphthalene-4.8-disulfonic acid with m-toluidine, diazotizing and coupling with m-toluidine again diazotizing and coupling with 4-methyl-2-aminophenoxy-acetic acid. To this suspension there is added at 5° C. with stirring the solution of 32 parts of 2-phenylamino-8-hydroxynaphthalene-6-sulfonic acid and 25 parts of anhydrous sodium carbonate in 1000 parts of water, keeping the mixture sodium carbonate alkaline during the coupling. When the coupling is complete the dyestuff is isolated in the usual way; it dyes cotton grey-brown shades, the dyeing aftertreated with copper salts is brown. In its free state the dyestuff corresponds to the following formula:

sodium carbonate in 900 parts of water, keeping the mixture sodium carbonate alkaline during the coupling. The dyestuff which is isolated in the usual way after the coupling is complete yields on cotton reddish-grey, when aftertreated with copper salts dark grey shades. The dye-

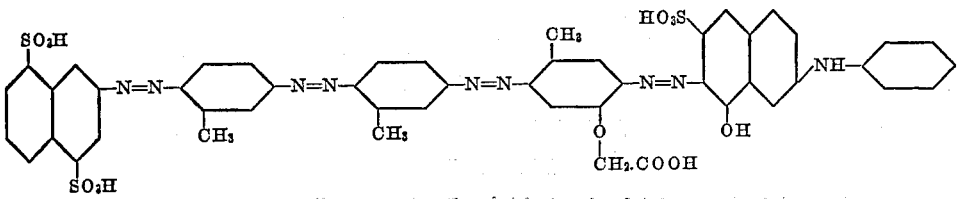

If 2-phenylamino-8-hydroxynaphthalene-6-sulfonic acid is replaced by 2-phenylamino-5-hydroxynaphthalene-7-sulfonic acid or by the azo dyestuff obtained from diazotized aminotriazole-carboxylic acid and 2-amino-5-hydroxynaphthalene-7-sulfonic acid in acid medium dyestuffs are obtained, dyeing cotton grey-blue shades. By aftertreatment with copper salts grey-green to olive-grey shades are obtained.

stuff corresponds in its free state to the following formula:

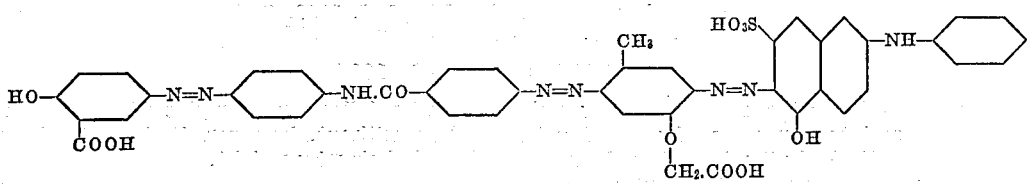

Example 3

There is prepared an aqueous suspension of the diazo compound of the dyestuff (quantity corresponding to 6.9 parts of sodium nitrite), which is obtained by coupling diazotized p-aminobenzene-azo-salicylic acid with 4-methyl-2-aminophenoxy-acetic acid. To this suspension there is added at 5° C. with stirring the solution of 32 parts of 2-phenylamino-5-hydroxynaphthalene-7-sulfonic acid and 25 parts of anhydrous sodium carbonate in 950 parts of water, keeping the mixture sodium carbonate alkaline during the coupling. The isolated dyestuff yields on cotton blue-grey shades and when aftertreated with copper salts dark grey shades. The dyestuff corresponds in its free state to the following formula:

If 2-phenylamino-5-hydroxy-7-sulfonic acid is replaced by the coupling components mentioned in the following table, dyestuffs are obtained, dyeing cotton shades as indicated.

| Coupling component | Dyeing on cotton | Dyeing on cotton aftertreated with copper salts |
|---|---|---|
| 2-amino-5-hydroxynaphthalene-7-sulfonic acid. | Currant | Dark-grey-black. |
| 2-amino-8-hydroxynaphthalene-6-sulfonic acid. | Greenish dark-grey. | Black brown. |
| 2-phenylamino-8-hydroxynaphthalene-6-sulfonic acid. | Olive | Brown. |
| 1-(4'.8'-disulfo-2'-naphthyl)-3-methyl-5-pyrazolone. | Orange brown | Orange brown. |
| 2-benzoylamino-5-hydroxynaphthalene-7-sulfonic acid. | Currant | Violet brown. |
| 2.4-dihydroxyquinoline | Light brown | Yellow brown. |
| Dyestuff obtained by coupling diazotized aminotriazole-carboxylic acid with 2-amino-5-hydroxynaphthalene - 7 - sulfonic acid in acid medium. | Grey | Olive. |

If instead of the above employed diazo compound the diazo compound of the dyestuffs obtained by coupling diazotized 4-aminobenzoyl-4-aminobenzene-azo-salicylic acid with 4-methoxy-2-amino-phenoxy-acetic acid or with α- or β-(4-

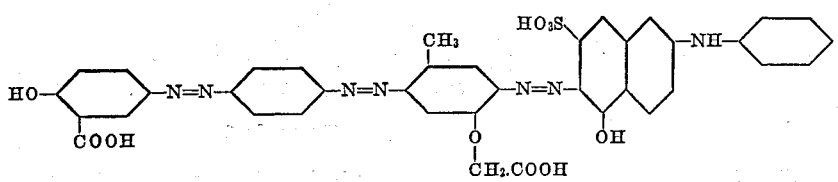

Example 4

There is prepared a suspension of the diazo compound of the dyestuff (quantity corresponding to 6.9 parts of sodium nitrite) which is obtained by coupling of diazotized 4-aminobenzoyl-4-aminobenzene-azo-salicylic acid with 4-methyl-2-aminophenoxy-acetic acid. To the suspension there is added a 5° C. with stirring the solution of 32 parts of 2-phenylamino-5-hydroxynaphthalene-7-sulfonic acid and 85 parts of anhydrous methyl - 2 - amino-phenoxy) - propionic acid is coupled in analogous manner with 2-phenylamino-5-hydroxynaphthalene - 7 - sulfonic acid dyestuffs are obtained which dye cotton when aftertreated with copper salts blue-grey or dark grey shades.

Example 5

The suspension of the diazo compound of the dyestuff of the constitution:

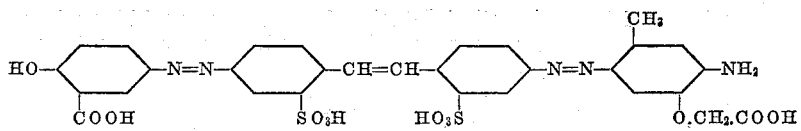

(quantity corresponding to 6.9 parts of sodium nitrite) is added at 5° C. with stirring to the solution of 32 parts of 2-phenylamino-5-hydroxynaphthalene-7-sulfonic acid and 85 parts of anhydrous sodium carbonate in 1100 parts of water, keeping the mixture sodium carbonate alkaline during the coupling. The dyestuff isolated in the usual way yields on cotton blue-grey, when aftertreated with copper salts, dark-grey shades. The dyestuff corresponds in the free state to the following formula:

mentioned coupling component is replaced by other coupling components

| Coupling component | Dyeing on cotton | Dyeing on cotton aftertreated with copper salts |
|---|---|---|
| 2 - phenylamino - 5 - hydroxynaphthalene-7-sulfonic acid. | Currant | Dark grey. |
| 2-amino-5-hydroxynaphthalene-7-sulphonic acid. | ___do___ | Do. |
| 2-amino-8-hydroxynaphthalene-6-sulfonic acid. | Grey | Grey brown. |
| 2 - phenylamino - 8 - hydroxynaphthalene-6-sulfonic acid. | Grey olive | Brown. |
| Dyestuff of diazotized aminotriazole carboxylic acid with 2-amino-5-hydroxynaphthalene-7-sulfonic acid in acid medium. | Grey violet | Grey olive. |
| Dyestuff of diazotized aminosalicylic acid with 2-amino-5-hydroxynaphthalene-7-sulfonic acid in acid medium. | Violet grey | Do. |

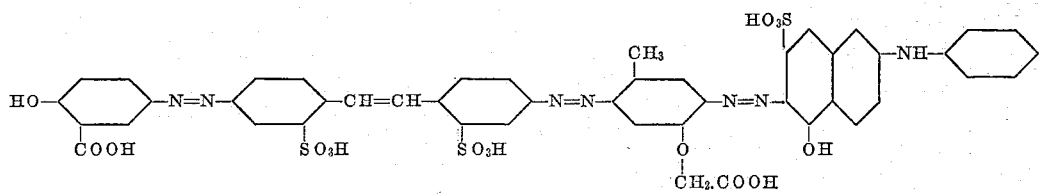

Example 6

The suspension of the diazo compound of the dyestuff of the constitution

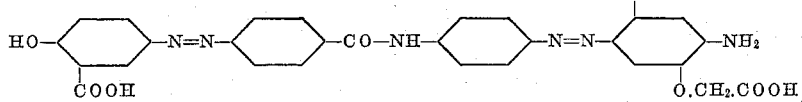

(quantity corresponding to 6.9 parts of sodium nitrite) is added at 5° C. with stirring to the solution of 40 parts 1-(4'.8'-disulfo-2'-naphthyl)-3-methyl-5-pyrazolone and 85 parts of anhydrous sodium carbonate in 890 parts of water, keeping the mixture sodium carbonate alkaline during the coupling. The dyestuff isolated in the usual way dyes cotton red-orange, when aftertreated with copper salts reddish-brown shades. The dyestuff corresponds in its free state to the following formula:

Example 7

There is prepared a suspension of the diazo compound of the dyestuff (quantity corresponding to 6.9 parts of sodium nitrite) which is obtained by coupling diazotized aminosalicylic acid with 1-aminonaphthalene-6-sulphonic acid, subsequently diazotizing and coupling with 4-methyl-2-amino-phenoxy-acetic acid. The suspension is added at 5° C. with stirring to the solution of 32 parts of 2-phenylamino-5-hydroxynaphthalene-7-sulfonic acid and 25 parts of anhydrous sodium carbonate in 950 parts of water, keeping the mixture sodium carbonate alkaline during the coupling. The dyestuff isolated in the

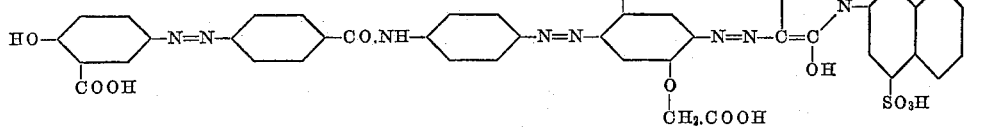

The following table indicates the shades of the dyestuffs which are obtained when the above usual way yields on cotton reddish-blue, when aftertreated with copper salts bluer shades. The dyestuff corresponds in its free state to the following formula:

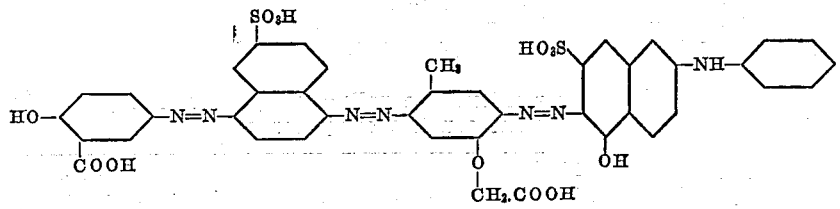

If 2-phenylamino-5-hydroxynaphthalene-7-sulfonic acid is replaced by a coupling component of the following table dyestuffs are obtained which dye cotton shades as indicated

| Coupling compinent | Dyeing on cotton | Dyeing on cotton after-treated with copper salts |
|---|---|---|
| 2-amino-5-hydroxynaphthalene-7-sulfonic acid. | Reddish-blue. | Blue. |
| 2-amino-8-hydroxynaphthalene-6-sulfonic acid. | Reddish navy blue. | Reddish navy blue. |
| 2-(4'-benzoylamino-phenylamino)-5-hydroxynaphthalene-7-sulfonic acid. | Blue. | Grey blue. |
| Dyestuff of diazotized aminotriazole carboxylic acid with 2-amino-5-hydroxynaphthalene-7-sulfonic acid in acid medium. | ____do____ | Blue grey. |
| Dyestuff of diazotized aminosalicylic acid with 2-amino-5-hydroxynaphthalene-7-sulfonic acid in acid medium. | Grey. | Grey. |

If in the diazo compounds mentioned in the beginning of this example the 4-methyl-2-aminophenoxy-acetic acid is replaced by the 2-aminophenoxy-acetic acid, the dyestuffs obtained in the usual way yield on cotton the following shades:

| Coupling component | Dyeing on cotton | Dyeing on cotton after-treated with copper salts |
|---|---|---|
| 2-amino-5-hydroxynaphthalene-7-sulfonic acid. | Blue violet. | Reddish navy blue. |
| 2-phenylamino-5-hydroxynaphthalene-7-sulfonic acid. | Reddish-blue. | Blue. |
| 2-(p-benzoylaminophenylamino)-5-hydroxynaphthalene-7-sulfonic acid. | ____do____ | Steel blue. |
| Dyestuff of diazotized aminotriazole carboxylic acid with 2-amino-5-hydroxynaphthalene-7-sulfonic acid in acid medium. | Blue. | Violetish-grey. |
| Dyestuff of diazotized aminosalicylic acid with 2-amino-5-hydroxynaphthalene-7-sulfonic acid in acid medium. | ____do____ | Grey. |

If, however, in the mentioned diazo compound 4-methyl-2-aminophenoxy-acetic acid is replaced by 4-methoxy-2-aminophenoxy-acetic acid, the dyestuffs obtained in the usual way, yield on cotton the following shades:

| Coupling component | Dyeing on cotton | Dyeing on cotton after-treated with copper salts |
|---|---|---|
| 2-amino-5-hydroxynaphthalene-7-sulfonic acid. | Greenish blue. | Greenish navy blue. |
| 2-phenylamino-5-hydroxynaphthalene-7-sulfonic acid. | ____do____ | Do. |
| Dyestuff of diazotized aminotriazole carboxylic acid with 2-amino-5-hydroxynaphthalene-7-sulfonic acid in acid medium. | Blue. | Dull blue. |

Dyestuffs of similar shades are obtained, when the aforementioned coupling components are coupled with the diazo compound of the dyestuff obtained by coupling diazotized aminosulfosalicylic acid with 1-aminonaphthalene-6- or 7-sulphonic acid, again diazotizing and coupling with 4-methyl-2-aminophenoxy-acetic acid.

*Example 8*

The suspension of the diazo compound of the dyestuff of the constitution:

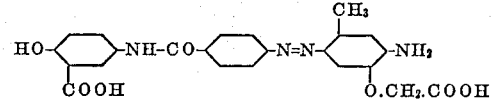

(quantity corresponding to 6.9 parts of sodium nitrite) is added at 5° C. with stirring to the solution of 37.8 parts of the dyestuff obtained by coupling diazotized amino-triazole-carboxylic acid with 2-amino-5-hydroxynaphthalene-7-sulfonic acid in acid medium, and 85 parts of anhydrous sodium carbonate in 1500 parts of water, keeping the mixture sodium carbonate alkaline during the coupling. The dyestuff isolated in the usual manner dyes cotton reddish-navy blue, when aftertreated with copper salts blue-grey shades. The dyestuff corresponds in its free state to the following formula:

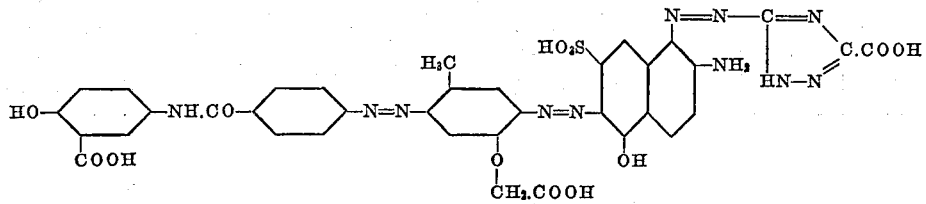

*Example 9*

The suspension of the diazo compound of the dyestuff of the constitution:

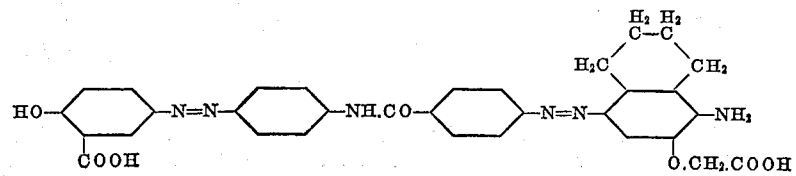

(quantity corresponding to 6.9 parts of sodium nitrite) is added at 3° C. with stirring to the solution of 32 parts of 2-phenylamino-5-hydroxynaphthalene-7-sulfonic acid and 25 parts of anhydrous sodium carbonate in 1000 parts of water, keeping the mixture sodium carbonate alkaline during the coupling. The dyestuff isolated in the usual way yields on cotton reddish-grey, when aftertreated with copper salts, greenish-dark grey shades. The dyestuff corresponds in its free state to the following formula:

of hydroxy-acetic acid and hydroxy-propionic acid, $R_2$ stands for one of the group consisting of the benzene nucleus, the alkyl-, alkoxy- and tetramethylene-substituted benzene nucleus, and $R_4$ stands for a radical of the group consisting of coupling components bearing a hydroxy group in a position adjacent to the —N=N— bridge and a 2-amino-5-hydroxynaphthalene-7-sulfonic acid substituted in the 1-position by an arylazo radical whereby at least one of the radicals $R_1$ and $R_4$ is substituted by an arylazo radical.

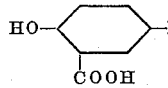
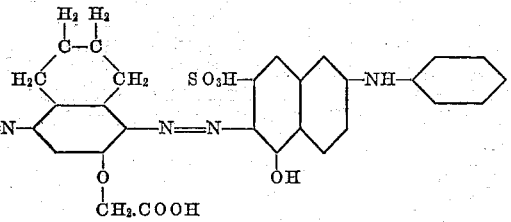

Example 10

The suspension of the diazo compound of the dyestuff of the constitution

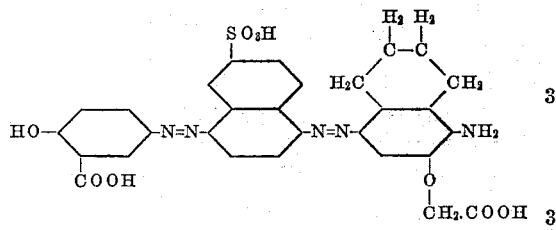

(quantity corresponding to 6.9 parts of sodium nitrite) is added at 5° C. with stirring to the solution of 32 parts of 2-phenylamino-5-hydroxynaphthalene-7-sulfonic acid and 25 parts of anhydrous sodium carbonate in 950 parts of water, keeping the mixture sodium carbonate alkaline during the coupling. The dyestuff isolated in the usual way dyes cotton blue-green, when aftertreated with copper salts, blue-grey shades. The dyestuff corresponds in its free state to the following formula:

2. As new products polyazodyestuffs of the general formula

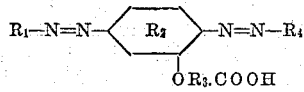

wherein $R_1$—N=N— stands for the residue of a diazo compound derived from aromatic amines selected from the group consisting of amines and aminoazodyestuffs of the benzene and naphthalene series, $O.R_3.COOH$ stands for the radical of a hydroxy carboxylic acid of the group consisting of hydroxy-acetic acid and hydroxy-propionic acid, $R_2$ stands for one of the group consisting of the benzene nucleus, the alkyl-, alkoxy- and the tetramethylene-substituted benzene nucleus, and $R_4$ stands for the radical of a 2-amino-5-hydroxynaphthalene-7-sulfonic acid substituted in the 1-position by an arylazo radical.

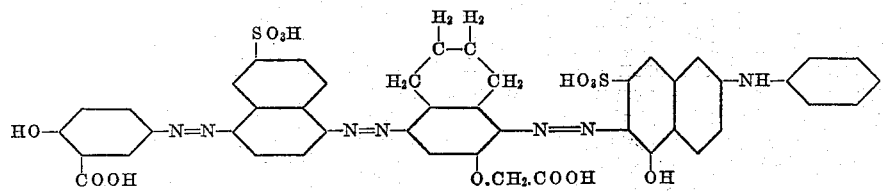

If 2-phenylamino-5-hydroxynaphthalene-7-sulfonic acid is replaced by 2-(4'-benzoylaminophenylamino) - 5 - hydroxynaphthalene-7-sulfonic acid a dyestuff is obtained, dyeing cotton blue, when aftertreated with copper salts, grey-blue shades.

We claim:

1. As new products polyazodyestuffs of the general formula

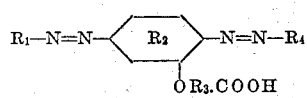

wherein $R_1$—N=N— stands for the residue of a diazo compound derived from aromatic amines selected from the group consisting of amines and aminoazodestuffs of the benzene and naphthalene series, $O.R_3.COOH$ stands for the radical of a hydroxy carboxylic acid of the group consisting 3. As new products polyazodyestuffs of the general formula

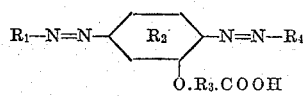

wherein $R_1$—N=N— stands for the residue of a diazo compound of an amine of the benzene series, $OR_3.COOH$ stands for the radical of a hydroxy carboxylic acid of the group consisting of hydroxy-acetic acid and hydroxy-propionic acid, $R_2$ stands for one of the group consisting of the benzene nucleus, the alkyl-, alkoxy- and tetramethylene-substituted benzene nucleus, and $R_4$ stands for the radical of a 2-amino-5-hydroxynapthalene-7-sulfonic acid substituted in the 1-position by an arylazo radical.

4. As new products polyazodyestuffs of the general formula $$R_1-N=N-\underset{O.R_3.COOH}{\langle R_2 \rangle}-N=N-R_4$$

wherein $R_1-N=N-$ stands for the residue of a diazo compound of an amine of the naphthalene series, $OR_3.COOH$ stands for the radical of a hydroxy carboxylic acid of the group consisting of hydroxy-acetic acid and hydroxy-propionic acid, $R_2$ stands for the one of the group consisting of the benzene nucleus, the alkyl-, alkoxy- and tetramethylene-substituted benzene nucleus, and $R_4$ stands for the radical of a 2-amino - 5 - hydroxynaphthalene - 7 - sulfonic acid substituted in the 1-position by an arylazo radical.

5. As new products polyazodyestuffs of the general formula $$R_1-N=N-\underset{OR_3.COOH}{\langle R_2 \rangle}-N=N-R_4$$

wherein $R_1-N=N-$ stands for the residue of a diazoazo compound of an aminoazodystuff of the benzene series, $OR_3.COOH$ stands for the radical of a hydroxy carboxylic acid of the group consisting of hydroxy-acetic acid and hydroxy-propionic acid, $R_2$ stands for one of the group consisting of the benzene nucleus, the alkyl-, alkoxy- and tetramethylene-substituted benzene nucleus, and $R_4$ stands for a radical of the group consisting of coupling components bearing a hydroxy group in a position adjacent to the $-N=N-$ bridge and a 2-amino-5-hydroxynaphthalene-7-sulfonic acid substituted in the 1-position by an arylazo radical.

6. As new products polyazodystuffs of the general formula $$R_1-N=N-\underset{OR_3.COOH}{\langle R_2 \rangle}-N=N-R_4$$

wherein $R_1-N=N-$ stands for the residue of a diazo azo compound of an aminoazodyestuff of the benzene series, $OR_3.COOH$ stands for the radical of a hydroxy carboxylic acid of the group consisting of hydroxy-acetic acid and hydroxy-propionic acid, $R_2$ stands for one of the group consisting of the benzene nucleus, the alkyl-, alkoxy- and tetramethylene-substituted benzene nucleus, and $R_4$ stands for the radical of a 2-amino-5-hydroxynaphthalene - 7 - sulfonic acid substituted in the 1-position by an arylazo radical.

7. As new products polyazodyestuffs of the general formula $$R_1-N=N-\underset{OR_3.COOH}{\langle R_2 \rangle}-N=N-R_4$$

wherein $R_1-N=N-$ stands for the residue of a diazoazo compound of an aminoazodystuff one component of which belongs to the benzene series and the other to the naphthalene series, $OR_3.COOH$ stands for the radical of a hydroxy carboxylic acid of the group consisting of hydroxy-acetic acid and hydroxy-propionic acid, $R_2$ stands for one of the group consisting of the benzene nucleus, the alkyl-, alkoxy- and tetramethylene-substituted benzene nucleus, and $R_4$ stands for a radical of the group consisting of coupling components bearing a hydroxy group in a position adjacent to the $-N=N-$ bridge and a 2-amino-5-hydroxy-naphthalene-7-sulfonic acid substituted in the 1-position by an arylazo radical.

8. As new products polyazodyestuffs of the general formula $$R_1-N=N-\underset{OR_3-COOH}{\langle R_2 \rangle}-N=N-R_4$$

wherein $R_1-N=N-$ stands for the residue of a diazoazo compound of an aminoazodyestuff one component of which belongs to the benzene series and the other to the naphthalene series, $OR_3.COOH$ stands for the radical of a hydroxy carboxylic acid of the group consisting of hydroxy-acetic acid and hydroxy-propionic acid, $R_2$ stands for one of the group consisting of the benzene nucleus, the alkyl-, alkoxy- and tetramethylene-substituted benzene nucleus, and $R_4$ stands for the radical of a 2-amino-5-hydroxy-naphthalene-7-sulfonic acid substituted in the 1-position by an arylazo radical.

9. As new products polyazodyestuffs of the general formula $$R_1-N=N-\underset{OR_3.COOH}{\langle R_2 \rangle}-N=N-R_4$$

as claimed in claim 5, wherein the azo portion of $R_1-N=N-$ is $$HO-\underset{COOH}{\langle \; \rangle}-N=N-$$

10. As new products polyazodyestuffs of the general formula $$R_1-N=N-\underset{OR_3.COOH}{\langle R_2 \rangle}-N=N-R_4$$

as claimed in claim 6, wherein the azo portion of $R_1-N=N-$ is $$HO-\underset{COOH}{\langle \; \rangle}-N=N-$$

11. As new products polyazodyestuffs of the general formula $$R_1-N=N-\underset{OR_3.COOH}{\langle R_2 \rangle}-N=N-R_4$$

as claimed in claim 7, wherein the azo portion of $R_1-N=N-$ is $$HO-\underset{COOH}{\langle \; \rangle}-N=N-$$

12. As new products polyazodyestuffs of the general formula $$R_1-N=N-\underset{OR_3.COOH}{\langle R_2 \rangle}-N=N-R_4$$

as claimed in claim 8, wherein the azo portion of $R_1-N=N-$ is $$HO-\underset{COOH}{\langle \; \rangle}-N=N-$$

13. As new product the polyazodyestuff corresponding in its free state to the following formula:

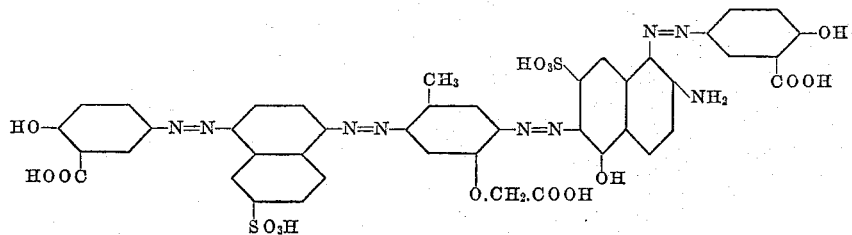

and dyeing cotton grey shades which, when aftertreated with copper salts, show an improved fastness to washing and light.

14. As new product the polyazodyestuff corresponding in its free state to the following formula:

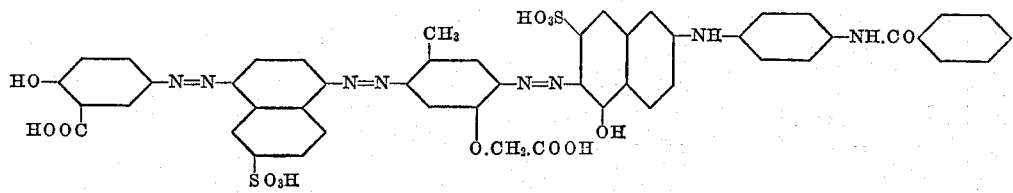

and dyeing cotton blue shades which change into greyish-blue shades of improved fastness to washing and light, when aftertreated with copper salts.

15. As new product the polyazodyestuff corresponding in its free state to the following formula:

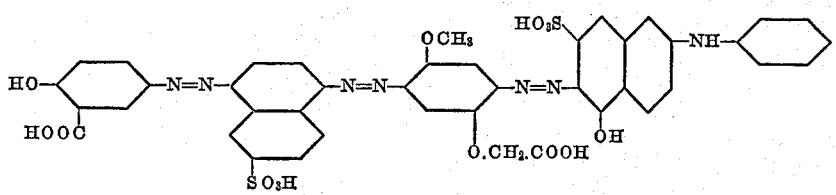

and dyeing cotton greenish-blue shades which change into greenish-navy blue shades of improved fastness to washing and light, when aftertreated with copper salts.

DETLEF DELFS.
EBERHARD STEIN.